Aug. 29, 1933.  B. E. ROSE  1,924,416
OFFSET HARROW
Filed Aug. 4, 1931  3 Sheets-Sheet 1

INVENTOR
*Bruce E. Rose*
BY
ATTORNEY

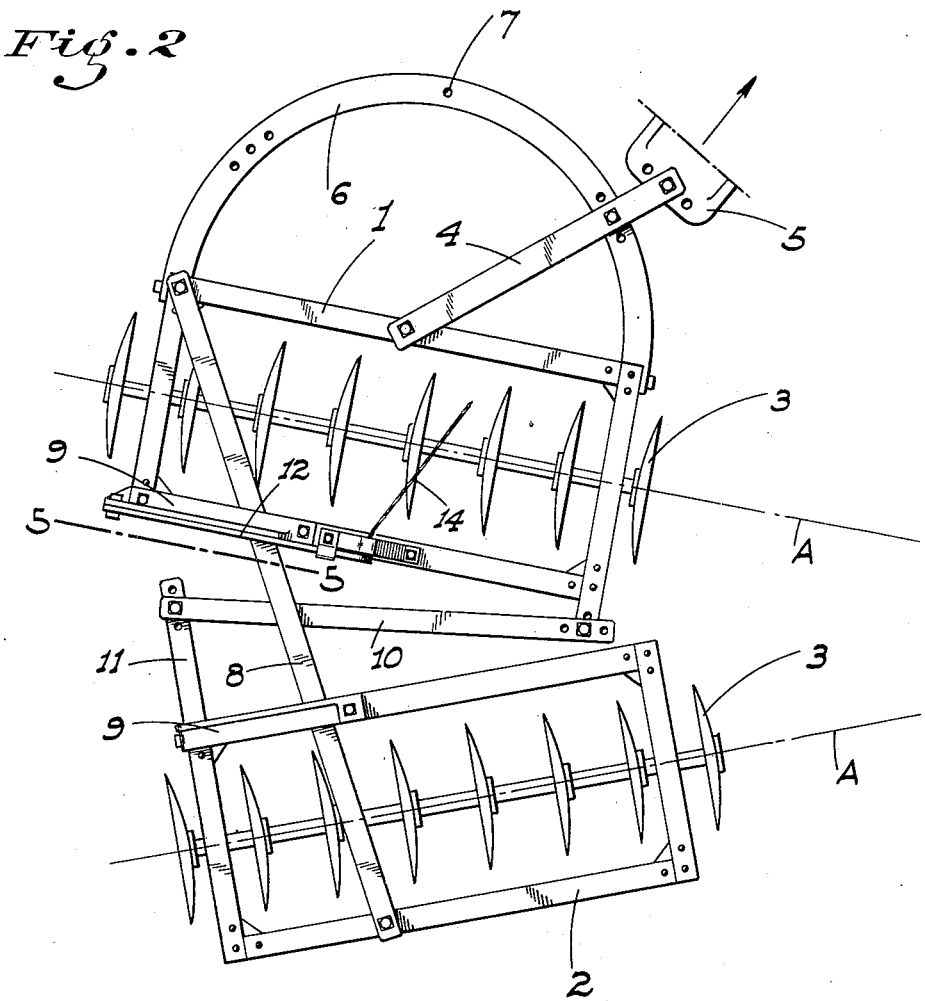
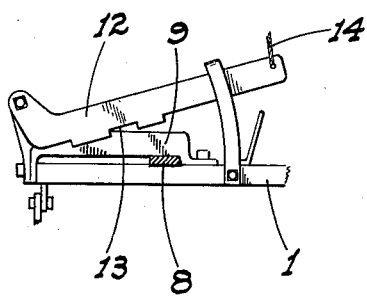

Aug. 29, 1933.  B. E. ROSE  1,924,416
OFFSET HARROW
Filed Aug. 4, 1931  3 Sheets-Sheet 3

INVENTOR
*Bruce E. Rose*
BY
ATTORNEY

Patented Aug. 29, 1933

1,924,416

UNITED STATES PATENT OFFICE 1,924,416

OFFSET HARROW

Bruce E. Rose, Porterville, Calif.

Application August 4, 1931. Serial No. 554,988

9 Claims. (Cl. 55—83)

This invention relates to disc harrows of the offset gang type and particularly to a connecting structure for the gangs arranged so that they may be readily turned or steered to the right as well as to the left with the turning of the draft tractor in a corresponding direction.

The structure of the present invention particularly represents improvements over that shown in my co-pending application for patent, Serial No. 436,416, filed May 17, 1930; inasmuch as the desired results are accomplished in a more efficient manner and with the use of fewer parts. I have also provided a simple catch device so arranged that the gangs may be easily locked against relative movement in certain positions relative to each other; said catch means being capable of operation by the driver of the tractor from his seat thereon.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is a similar view showing the gangs as angled when making a right hand turn.

Fig. 5 is a fragmentary transverse section on the line 5—5 of Fig. 2.

Figure 1:
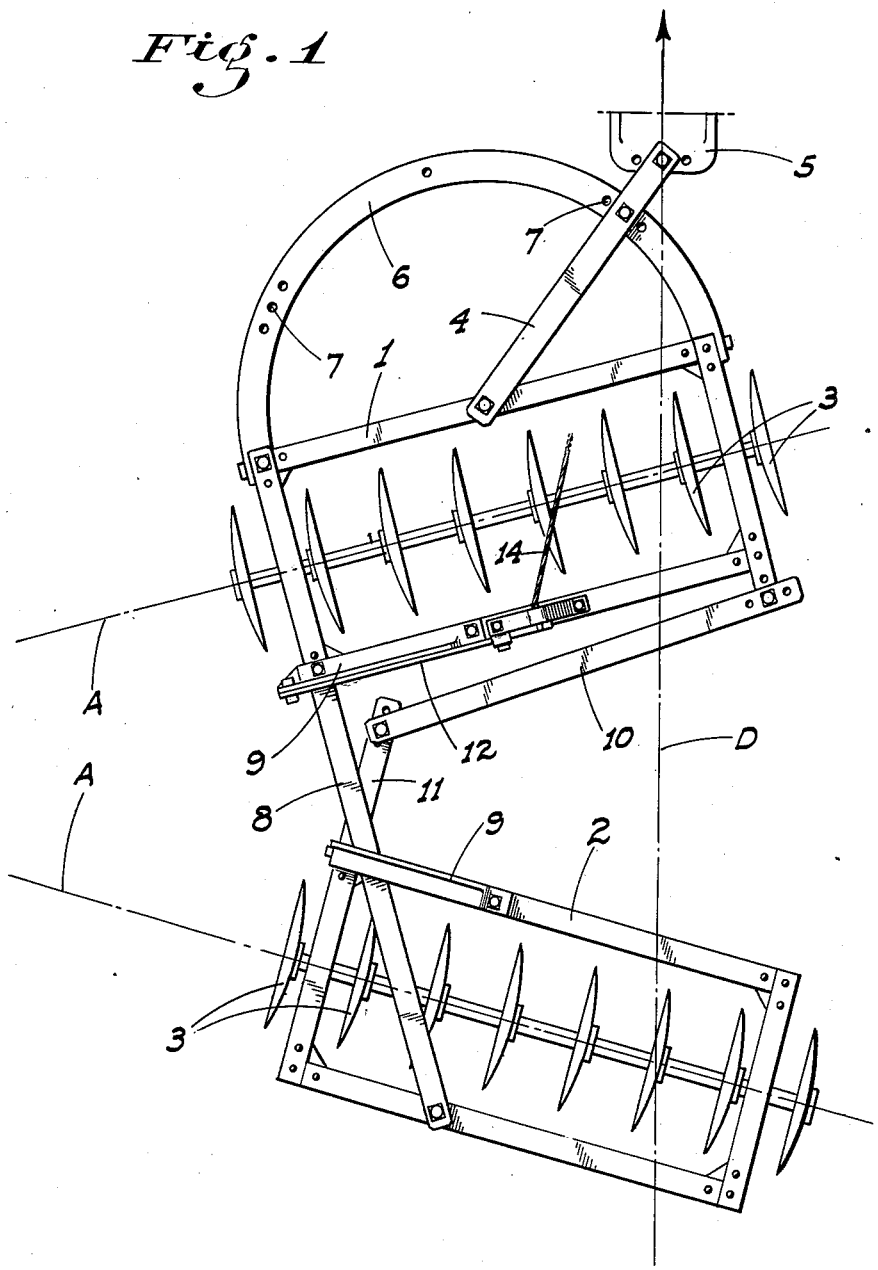
Fig. 1 is a top plan view of my improved harrow with the gangs in their normal working position.

Referring now more particularly to the characters of reference on the drawings, the numerals 1 and 2 denote the front and rear gang frames respectively, in connection with which the rows of discs 3 are mounted in any suitable manner. A draft arm 4 extends forwardly from the front frame 1 and is pivoted centrally thereon. At its forward end said arm is adapted for swivel connection to the draw head 5 of the tractor. A curved guide member 6, centered at the pivotal connection of the arm with the frame 1 extends forwardly and under said arm, being connected at its ends to the frame 1 at the front thereof.

The member 6 is provided with sets of circumferentially spaced holes 7 so that the arm may be detachably connected thereto and positioned and held at different angles relative to the gang frames and to the line of draft as the conditions of operation may determine.

Pivotally connected at its forward end on the frame 1 adjacent its left hand side is a bar 8. This bar extends thence over the frames 1 and 2 and is pivotally connected at its rear end to the back of said frame 2 at a predetermined point between its left hand side and its center of width. The bar intermediate its ends is engaged by guide yokes 9 secured on the rear and forward ends of the frames 1 and 2 respectively and extending transversely thereof; said guides maintaining the bar and frames in parallel relationship to each other in a horizontal plane.

Pivotally connected at one end to the forward frame 1 at the back and right hand side thereof is a transversely extending link 10. This link projects toward the left hand side of the harrow and at its corresponding end is pivotally connected to an extension 11 projecting forwardly from the left hand side of the frame 2 and rigid therewith.

The length of the bar and link is such that at the normal operating position of the gangs, the axial lines A of the discs are disposed at substantially equal angles to the line of draft D and intersect some distance to the left of such line. Said axial lines therefore include an angle facing to the right of the harrow and are substantially radial relative to the center of a left hand turning movement of the draft tractor.

When the tractor is swung to the right to make a right hand turn, the movement is transmitted to the forward frame 1 from the rigidly connected arm 4. This forces the right hand side of said frame rearwardly and to the left and moves the left hand side forwardly; said frame turning about its connection with the bar 8 as an axis. In other words, the angled relation of said frame to the normal line of draft is reversed. This movement of the forward frame causes the link 10 (which is nearly parallel to the front frame in a transverse plane) to be shifted laterally toward the left. This movement of said link through its connection with the extension 11 exerts a lateral movement to the left on the forward end of the rear frame 2. Said frame turning about its pivotal connection with the bar 8 as an axis swings forwardly at its right hand side so that its normal angular setting is also reversed. The angle of both gangs is therefore reversed and the axial lines A of the disc now intersect some distance to the right of the frames and the line of draft, facilitating a right hand turning movement.

During this reversal of movement of the gang frames the bar 8 remains relatively stationary, but the swinging of the frames shifts the bar along the guide yokes so that it abuts against their right hand ends. This limits the extent to which the gangs may thus angle relative to each other and prevents interference between the adjacent right hand corners of the gang frames.

When the tractor is again straightened out and returns to its normal working position, the above described movement of the frames is automatically reversed and they return to their initial position.

Figure 3:
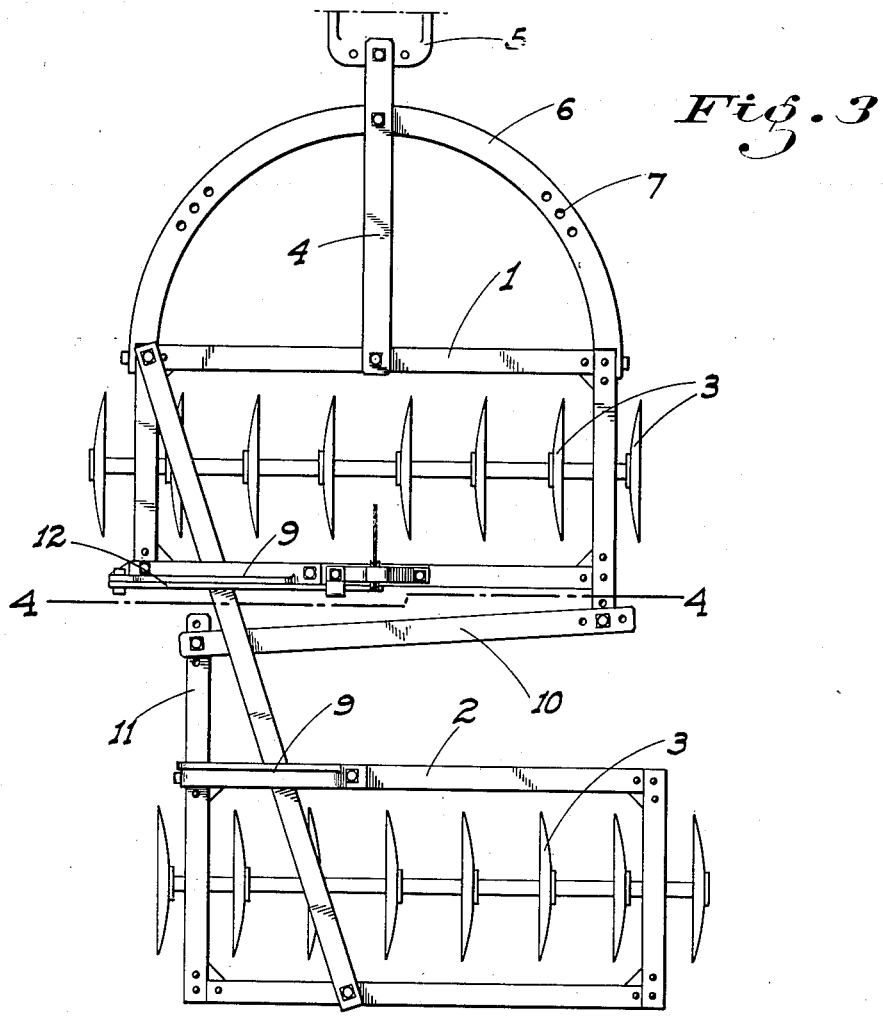
Fig. 3 is a similar view showing the gangs disposed in parallel relation as when the harrow is being drawn along but is not in operation.
Figure 4:
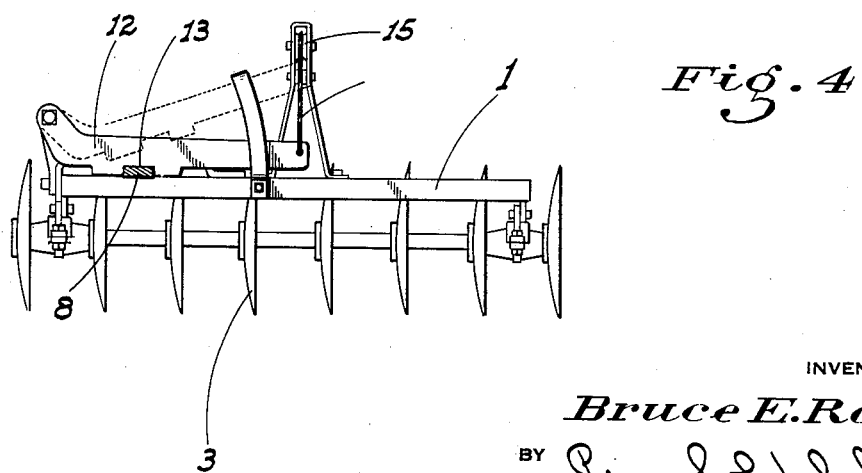
Fig. 4 is a transverse section on the line 4—4 of Fig. 3.

When it is desired to transport the harrow in contact with the ground without the discs operating, and so that the least resistance to a forward movement is had, the angle of the frames is altered only sufficient to bring them into parallel relation. The arm 4 is also shifted around the member 6 and secured thereto in a position such that it is longitudinally alined with the line of draft. This setting of the harrow is shown in Fig. 3. The harrow frames are then held in that position by a latch bar 12 which extends transversely of and is pivoted at one end on the forward frame 1 along side the corresponding guide yoke 9. The bar has a notch 13 to engage the bar 8 so as to hold the same against relative lateral movement, which prevents relative movement between the frames. The latch bar is also notched so as to engage the bar 8 if desired when said bar is in a left hand position, so as to positively hold the frames in a normal operating position irrespective of any slight turning movement of the tractor to the right. The latch may be raised from engagement with the bar 8 at will by a control cable 14 or the like connected to the free end of the latch and passing thence up and over a pulley 15 to a point of manipulation on the tractor.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An offset harrow structure comprising front and rear harrow gangs normally disposed at a predetermined angle to each other, means pivotally connecting the gangs for lateral swinging movement in either direction and means also connecting the gangs to cause the angular relationship thereof to be reversed by the swinging of the front gang toward the same side as said angle.

2. An offset harrow structure comprising front and rear harrow gangs normally disposed with a predetermined angle therebetween facing to the right relative to the direction of advancing movement of the structure, and means pivotally connecting the gangs for lateral swinging movement in either direction and means also connecting the gangs to cause the angular relationship of the gangs to be reversed by the swinging of the front gang to the right.

3. An offset harrow structure comprising front and rear harrow gangs normally disposed at a predetermined angle to each other and to the normal line of draft, means pivotally connecting the gangs for lateral swinging movement in either direction, means rigid with the front gang to directly connect the same to a draft tractor, whereby with a turning movement of the tractor to the right the front gang will be pulled around in the same direction as the tractor, and means connecting the gangs to cause such movement of the front gang to reverse the angular relationship of the gangs relative to each other and to said normal line of draft.

4. A harrow comprising a pair of disc gangs in tandem, means pivotally connecting the gangs for lateral swinging movement in either direction, connections between the tandem gangs whereby a draft pull on the front gang to one side of and parallel to the longitudinal center axis of the harrow will angle the gangs relative to each other so that the axial lines of the gangs will intersect at a point on the opposite side of the longitudinal center axis of the harrow, the connections being such that when the draft on the harrow is turned at an angle to the longitudinal center axis thereof toward the side opposite the point of intersection of the axial lines of the gangs the then angularity of the gangs relative to each other may be reduced or reversed according to the degree of turning movement.

5. A harrow comprising a front gang frame, a rear gang frame in tandem with the front frame, connections whereby the frames may be angled relative to each other and including a link connecting the end of one frame at the rear thereof with the opposite end of the other frame at the front thereof, a bar pivotally connected to one end of the front frame at the front of such frame, such bar being also pivotally connected to the rear frame at the rear thereof and at a point between the longitudinal center axis of the harrow and the end of the rear frame lying on the same side of such axis as the side on which the bar is pivoted to the front frame, and a draft appliance on the front frame.

6. A harrow as in claim 5, and means on one frame to engage the bar to limit the angling movement of the gang frames relative to each other.

7. An offset harrow structure comprising front and rear harrow gangs normally disposed in such predetermined relation to each other as to include an angle therebetween facing to one side, means pivotally connecting the gangs for lateral swinging movement in either direction and means also connecting the gangs to cause the same to swing relative to each other so that the included angle therebetween faces toward the opposite side when the front gang swings toward said one side.

8. An offset harrow structure including front and rear harrow gang frames, a bar extending between and pivoted on the frames, additional pivot connections between the frames to permit lateral swinging of the frames in either direction whereby the position of the bar relative to the frames will be altered with such swinging, and releasable catch means mounted on one frame to engage the bar and hold the same immovable relative to said frame.

9. An offset harrow structure including front and rear harrow gang frames, a bar extending between and pivoted on the frames, additional pivot connections between the frames to permit lateral swinging of the frames in either direction whereby the position of the bar relative to the frames will be altered with such swinging, a latch bar extending transversely of the front frame and over the first named bar, said latch bar being pivoted at one end on said frame and having a notch to fit over the first named bar, and release means applied to the latch bar to lift the same.

BRUCE E. ROSE.